United States Patent [19]

Kämpf et al.

[11] Patent Number: 5,286,414
[45] Date of Patent: * Feb. 15, 1994

[54] ELECTROCONDUCTIVE COATING COMPOSITION, A PROCESS FOR THE PRODUCTION THEREOF AND THE USE THEREOF

[75] Inventors: Günther Kämpf, Oestrich-Winkel; Michael Feldhues, Bad Soden am Taunus, both of Fed. Rep. of Germany

[73] Assignee: Hoechst Aktiengesellschaft, Frankfurt, Fed. Rep. of Germany

[*] Notice: The portion of the term of this patent subsequent to Mar. 3, 2010 has been disclaimed.

[21] Appl. No.: 66,913

[22] Filed: May 24, 1993

Related U.S. Application Data

[63] Continuation of Ser. No. 198,150, May 24, 1988, abandoned.

[30] Foreign Application Priority Data

May 26, 1987 [DE] Fed. Rep. of Germany ....... 3717668

[51] Int. Cl.$^5$ ...................... H01B 1/12; C08F 28/06; B32B 9/04
[52] U.S. Cl. .................................. 252/500; 252/518; 106/287.2; 106/287.21; 525/184; 526/256; 526/257; 526/258; 428/411.1; 427/58
[58] Field of Search ................ 252/500, 518; 106/287.2, 287.21; 525/184; 526/256, 257, 258; 428/411.1; 427/58

[56] References Cited

U.S. PATENT DOCUMENTS

| | | | |
|---|---|---|---|
| 4,452,727 | 6/1984 | Frommer et al. | 252/518 |
| 4,582,587 | 4/1986 | Holta et al. | 252/500 |
| 4,599,194 | 7/1986 | Frommer et al. | 252/518 |
| 4,711,742 | 12/1987 | Jen et al. | 252/500 |
| 4,781,443 | 11/1988 | Giles | 252/500 |
| 4,795,687 | 1/1989 | Suzuki et al. | 252/500 |
| 4,877,852 | 10/1989 | Tanaka et al. | 252/500 |
| 4,886,625 | 12/1989 | Albarella et al. | 252/500 |
| 4,962,158 | 10/1990 | Kobayashi et al. | 252/500 |
| 5,066,731 | 11/1991 | Feldhues et al. | 252/500 |
| 5,068,060 | 11/1991 | Jen et al. | 252/500 |
| 5,093,033 | 3/1992 | Feldhues et al. | 252/500 |
| 5,098,529 | 3/1992 | Feldhues | 252/500 |
| 5,210,217 | 5/1993 | Albarella et al. | 252/500 |

FOREIGN PATENT DOCUMENTS

0203438 12/1986 European Pat. Off. .
0253594 1/1988 European Pat. Off. .

OTHER PUBLICATIONS

Patent Abstracts of Japan, vol. 10, No. 203 (C-360) (Jul. 16, 1986).

*Primary Examiner*—Paul Lieberman
*Assistant Examiner*—Bradley A. Swope
*Attorney, Agent, or Firm*—Connolly and Hutz

[57] ABSTRACT

A coating composition comprising a soluble oligomer of substituted thiophenes and, where appropriate, a soluble polymer gives, applied from the solution in a dipolar aprotic solvent, highly adherent electroconductive coatings on nonconductive or semiconductive materials. In this way, films and fibers having an antistatic finish and moldings for electronics and electrics can be produced.

18 Claims, No Drawings

ELECTROCONDUCTIVE COATING COMPOSITION, A PROCESS FOR THE PRODUCTION THEREOF AND THE USE THEREOF

This is a continuation of Ser. No. 07/198,150, filed May 24, 1988, now abandoned.

The invention relates to an electroconductive coating composition which is capable of preventing electrostatic charge on surfaces, to a process for the production thereof, and to the use thereof.

For reasons of safety at work, such as, for example, explosion protection, packages made from highly insulating plastics must usually be provided with an antistatic finish. In this field, transparent conductive films are particularly desired since identification of the contents is possible.

In other uses too, the high electrostatic chargeability of customary plastics results in difficulties:
 Poor wind-up behavior of calendered films and fastness.
 Mutual adhesion of film sheets during processing and in filling plants.
 Sparking during emptying of plastic containers in the presence of explosive gas/air mixtures (for example solvents) can result in dangerous explosions.
 The printability of plastic parts is destroyed.
 Plastic parts attract dust during storage and become soiled.
 In the case of packaging of sensitive electronic components, the latter are destroyed by electrostatic charge on packing.
 Photographic films and X-ray films can be rendered unusable by electrostatic charge due to so-called "static marking".

There are several ways of dissipating charges on the plastic surface:
a) Compounds made from plastics and carbon black or a metal powder or metal fibres. Since they only become active when the conductive particles come into contact (percolation), large added amounts of conductive material are necessary (typically 5% to 30%). The typical property profile of the plastic is thereby considerably modified, its mechanical properties become markedly worse and the optical properties, such as transparency and color, are totally changed.
b) In many plastics, the surfaces can be modified by an intensive corona discharge until electrostatic charge no longer occurs. Unfortunately, the action diminishes after a short time, meaning that this method cannot be used for long-term application and is often employed only to improve the coatability.
c) Conductive surfaces are produced by adding antistatics to the plastic surface, for example by dipping, soaking or spraying. However, these antistatics can also be incorporated into the plastic mass, and a long-term action is achieved. In both cases, it is a great disadvantage that the surface resistance of the plastics treated in this way is greatly dependent on atmospheric moisture; their effectiveness decreases rapidly, in particular when the materials are exposed to very low humidity.
d) Plastics can be coated with vapor-deposited metals or inorganic semiconductors in vacuo or by sputtering. These metal coatings must be applied very thinly if adequate transparency is required. As a consequence, these coatings are very sensitive and would have to be protected, by additional coatings, against mechanical and chemical damage. This process is complicated, involved and expensive. In addition, the choice of usable materials is limited by susceptibility to corrosion. In addition, metal coatings vapor-deposited on plastic films often exhibit poor coating adhesion, and it is necessary to improve this by additional process steps, such as, for example, the abovementioned corona treatment. In these multilayer film systems, the metal coating is also protected by a dielectric coating against external mechanical damage; the thickness of this dielectric coating must itself be observed very accurately in order to achieve the surface resistance desired. Together with a customary antistatic coating on the inside of the film, a storage effect for the electrical charges can occur, due to which the prevention of electrostatic charges is achieved only unsatisfactorily. Such products are therefore only suitable for screening against external fields (Faraday cage).

The object of the present invention is therefore to produce electroconductive coatings which do not have the abovementioned disadvantages and, in addition, can be applied to any desired surfaces.

It has been found that a coating composition comprising a soluble oligomer of substituted thiophenes and a soluble polymer can produce a highly adherent electroconductive coating on various substrates.

The invention thus relates to an electroconductive coating composition comprising 10 to 100% by weight of an oligomer having three to ten structural units which are connected to one another by linkage in the two-position and/or five-position, on statistical average comprising 60 to 100% by weight of structural units derived from at least one monomer of the formula (I)

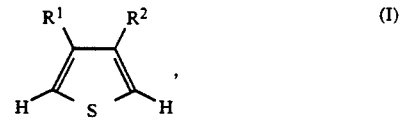

in which
 $R^1$ denotes a $C_1$–$C_{12}$ alkoxy group or —O(CH$_{n2}$CH$_2$O)$_n$CH$_3$ where n=1 to 4 and
 $R^2$ denotes a hydrogen atom, a $C_1$–$C_{12}$ alkyl group, a $C_1$–$C_{12}$-alkoxy group, or —O(CH$_2$CH$_2$O)$_n$CH$_3$ where n=1 to 4, or
 $R^1$ together with $R^2$ represents —O(CH$_2$)$_m$—CH$_2$— or —O(CH$_2$)$_m$—O—, in which m is 1 to 12, 0 to 40% by weight of structural units derived from at least one monomer of the formula (II)

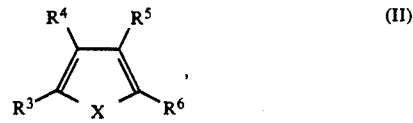

in which
 $R^4$ and $R^5$, independently of one another, denote a hydrogen atom, a halogen atom, a $C_1$–$C_{12}$-alkyl group or aryl or, together with the carbon atoms linking them, form an aromatic ring,
 $R^3$ and $R^6$, independently of one another, denote a hydrogen atom, or $R^3$ together with $R^4$ and the carbon atoms linking them, or $R^5$ together with $R^6$ together with the carbon atoms linking them, in each case form an aromatic ring, X denotes an oxygen atom, a sulfur atom, an =NH group, an =N-alkyl group or an =N-aryl group, 0 to 40% by weight of structural units derived from at least one monomer of formula (III)

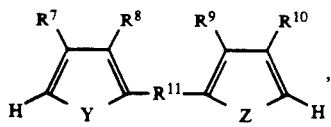

in which $R^7$, $R^8$, $R^9$ and $R^{10}$ independently of one another denote a hydrogen atom, a $C_1$-$C_{12}$ alkyl group, a $C_1$-$C_{12}$-alkoxy group or an aryl group, Y and Z, independently of one another, denote an oxygen atom, a sulfur atom, an =NH group, an =N-alkyl group or an =N-aryl group, $R^{11}$ denotes an arylene group, a heteroarylene group or a conjugated system of the formula —(—CH=CH)—$_o$, in which o is zero, 1, 2 or 3, 0 to 40% by weight of structural units derived from at least one monomer of the formula (IV)

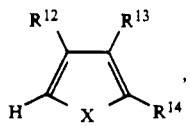

in which $R^{12}$ and $R^{13}$, independently of one another, denote a hydrogen atom, a halogen atom, a $C_1$-$C_{12}$-alkyl group, a $C_1$-$C_{12}$-alkoxy group, a $C_1$-$C_4$-alkylamino group or a $C_1$-$C_4$-acylamino group, $R^{14}$ denotes a halogen atom, a $C_1$-$C_{12}$-alkyl group, a $C_1$-$C_{12}$-alkoxy group, a $C_1$-$C_4$-alkylamino group or a $C_1$-$C_4$-acylamino group and X has the above-mentioned meaning, where the oligomer, in the oxidized form, is completely soluble in dipolar aprotic solvents at 25° C., and solutions having a content of at least 0.5 g of the oligomer in 100 ml of solvent are obtained at 25° C., and 0 to 90% by weight of a polymer which is dissolved or swollen in solvents or solvent mixtures having a $\delta_P$ value greater than 3.5 (cal/ccm)$^{\frac{1}{2}}$ and a $\delta_H$ value less than 6.5 (cal/ccm)$^{\frac{1}{2}}$.

In addition, the invention also relates to a proces for the production of the coating composition mentoned wherein oligomer and, where appropriate, polymer are dissolved or swollen together in a solvent or solvent mixture having a $\delta_P$ value greater than 3.5 (cal/ccm)$^{\frac{1}{2}}$ and a $\delta_H$ value less than 6.5 (cal/ccm)$^{\frac{1}{2}}$, and the mixture is recovered from the solvent.

Finally, the invention relates to the use of this coating composition for the production of electroconductive coatings on nonconductive or semiconductive materials.

The coating composition according to the invention comprises an oligomer and, where appropriate, a polymer.

The oligomer contains structural units which are derived, by linking in the 2-position and/or 5-position, from at least one monomer of the formula (I)

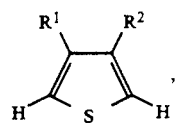

in which $R^1$ denotes a $C_1$-$C_{12}$-, preferably $C_1$-$C_4$-, in particular $C_1$-$C_2$-alkoxy group or —O(CH$_2$CH$_2$O)$_n$CH$_3$ where n=1 to 4, preferably 1 or 2, and $R^2$ denotes a hydrogen atom, a $C_1$-$C_{12}$-, preferably $C_1$-$C_4$-alkoxy group, in particular a $C_1$-$C_2$-alkoxy group, a $C_1$-$C_{12}$-, preferably $C_1$-$C_4$-alkyl group, or —O(CH$_2$CH$_2$O)$_n$CH$_3$ where n=1 to 4, preferably 1 or 2, or $R^1$ together with $R^2$ represents —O(CH$_2$)$_m$—CH$_2$— or —O(CH$_2$)$_m$—O— where m=1 to 12, preferably 1 to 4.

Examples of representatives of the formula (I) are 3-Methoxythiophene, 3-ethoxythiophene, 3-propoxythiophene, 3-methoxy-4-methylthiophene, 3-methoxy-4-ethylthiophene, 3-methoxy-4-butylthiophene, 3-ethoxy-4-methylthiophene, 3-ethoxy-4-ethylthiophene, 3,4-dimethoxythiophene, 3-ethoxy-4-methoxythiophene, 3-butoxy-4-methoxythiophene, 3-(methoxyethoxy)thiophene, 3-(methoxyethoxyethoxy)thiophene, 3,4-(ethylene-1,2-dioxy)thiophene and 3,4-(prop-3-ylene-1-oxy)thiophene. It is also possible to employ mixtures of monomers (I).

Suitable comonomers for the monomers (I) are all aromatic and heteroaromatic compounds which are capable of forming electroconductive polymers and with which the monomers (I) can be copolymerized. Examples which may be mentioned here are compounds of the formula (II)

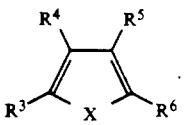

$R^4$ and $R^5$, independently of one another, are a hydrogen atom, a halogen atom, a $C_1$-$C_{12}$-, preferably $C_1$-$C_4$-alkyl group, or an aryl group, preferably phenyl or thienyl, or, together with the carbon atoms bonding them, form an aromatic ring, preferably a benzene, thiophene or pyrrole ring.

$R^3$ and $R^6$, independently of one another, are a hydrogen atom or, in each case with $R^4$ or $R^5$ and together with the carbon atoms bonding them, form an aromatic ring, preferably a benzene, thiophene or pyrrole ring.

X denotes an oxygen atoms, a sulfur atom, an =NH group, an =N-alkyl group, preferably =N-$C_1$-$C_4$-alkyl, or N-aryl, preferably N-phenyl.

Pyrrole, 3-chloropyrrole, 3-methylpyrrole, 3,4-dimethylpyrrole, N-methylpyrrole, thieno[3,2-b]pyrrole, carbazole, thiophene, 3-methylthiophene, 3-octylthiophene, 3,4-dimethylthiophene, 3,4-diethylthiophene, isothianaphthene and thieno[2,3-b]thiophene, diethieno[3,2-b; 2', 3'-d]thiophene, and dibenzothiophene, preferably pyrrole and 3-methylthiophene, are suitable.

Further suitable comonomers for monomers (I) are those of the formula (III):

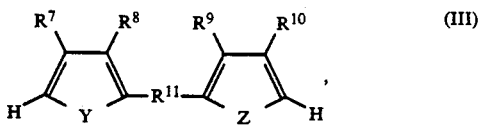

$R^7$, $R^8$, $R^9$ and $R^{10}$, independently of one another, are a hydrogen atom, a $C_1$-$C_{12}$-, preferably $C_1$-$C_4$-alkyl group, a $C_1$-$C_{12}$-alkoxy group, preferably $C_1$-$C_4$ alkoxy, or an aryl group, preferably phenyl or thienyl. Y and Z, independently of one another, denote an oxygen atom, a sulfur atom, an =NH group, an =N-alkyl group, preferably =N-$C_1$-$C_4$-alkyl, or an =N-aryl group, preferably =N-phenyl. $R^{11}$ represents arylene, preferably phenylene, heteroarylene, preferably thienylene, furanylene, pyrrolylene or a conjugated system of the formula

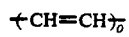

where o=0, 1, 2 or 3.

In particular, 1,2-di(2-thienyl)ethene, 1,2-di(3-methylthien-2-yl)ethene, 1,2-di(2-furanyl)ethene, 1-(2-furanyl)-2-(2-thienyl)ethene, 1-(2-pyrrolyl)-2-(2-thienyl)ethene, 1,4-di(2-thienyl)buta-1,3-diene, 1,4-di(2-furanyl)buta-1,3-diene, 1,4-di(2-thienyl)benzene, terthienyl(2,5-di(2-thienyl)thiophene), 2,5-di(2-thienyl)-pyrrole, 2,2'-bithiophene, 3,3'-dimethyl-2,2'-bithiophene, 3,3'-dimethoxy-2,2'-bithiophene, 3,4'-dimethoxy-2,2'-bithiophene and 4,4'-dimethoxy-2,2'-bithiophene are suitable.

The abovementioned comonomers (II) and (III) can also be used mixed with one another. The preparation of the compounds (II) and (III) is known from the prior art.

The oligomers contain three to ten structural units, preferably four to nine structural units and in particular five or six structural units. The amount of these structural units derived from at least one monomer of the formula (I) is on statistical average 60 to 100% by weight, preferably 90 to 100% by weight and in particular 95 to 100% by weight, relative to the structural units present in the undoped oligomer.

The amount of structural units derived from monomers of the formula (II) is, on statistical average 0 to 40, preferably 0 to 10% by weight, and the structural units derived from monomers of the formula (III) are present on statistical average to the extent of 0 to 40, preferably 0 to 10% by weight.

In addition, the terminal groups of the oligomers can be formed from structural units of monomers (IV) which can be added to the monomers of the general formula (I) in order to modify the degree of polymerization and the physical properties.

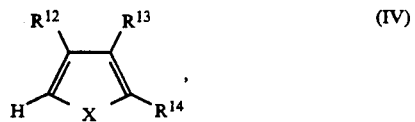

$R^{12}$ and $R^{13}$, independently of one another, are a hydrogen atom, a halogen atom, preferably chlorine or bromine, a $C_1$-$C_{12}$, preferably $C_1$-$C_4$-alkyl group, a $C_1$-$C_{12}$, preferably $C_1$-$C_4$-alkoxy group, a $C_1$-$C_4$ alkylamino group or a $C_1$-$C_4$-acylamino group, preferably acetylamino.

$R^{14}$ is a halogen atom, a $C_1$-$C_{12}$-, preferably $C_1$-$C_4$-alkyl group, a $C_1$-$C_{12}$-, preferably $C_1$-$C_4$-alkoxy group, a $C_1$-$C_4$-alkylamino group or a $C_1$-$C_4$-acylamino group, preferably acetyl amino.

X has the abovementioned meaning.

Examples of the compounds of formula (IV) are 2-methoxythiophene, 2-methylthiophene, 2-bromothiophene, 2-chlorothiophene, 2-acetylaminothiophene, 2-bromo-3-methoxythiophene, 2-bromo-4-methoxythiophene, 2-chloro-3-methylthiophene, 2,3-dimethoxythiophene, 2,4-dimethoxythiophene, 2,3-dimethylthiophene, 3-methoxy-2-methylthiophene, 2-methoxy-3-methylthiophene and 4-methoxy-2-methylthiophene, 2-chloro-4-methoxythiophene, 2-acetylamino-3-methoxythiophene, 2-methylpyrrole, 2-bromopyrrole, 2-chloropyrrole, 2-methylfuran and 2-methoxyfuran. As a consequence of the substitution in the 2-position, these compounds have a chain terminating action. The amount of (IV) is generally 0 to 40% by weight, preferably less than 10% by weight and in particular less than 5% by weight, relative to the total amount of monomers.

The soluble, electroconductive oligomers contain, in the oxidized form, an appropriate number of anions in order to compensate for the positive charges. These are preferably anions of the conductive salt which was employed in the preparation process. Examples of suitable anions which may be mentioned here are: $BF_4$, $PF_6$, $SbF_6$, $SbCl_6$, $FeCl_4$, $Fe[(CN)_6]^{3-}$, $F^-$, $Cl^-$, $Br^-$, $SCN^-$, $SO_4{2-}$, $HSO_4^-$, $PO_4{3-}$, alkyl-$SO_3^-$, perfluoroalkyl-$SO_3$, aryl-$SO_3$, alkyl-$CO_2$, perfluoroalkyl-$CO_2$, aryl-$CO_2$ and phenolate. With loss of thermal stability $ClO_4$, and $NO_3$ are also suitable. $BF_4$, $PF_6$ and $CF_3SO_3$, are preferred. It is also possible for mixtures of the abovementioned anions incorporated into the oligomer to be present. The number of these anions, relative to the number of monomer units, is usually 10 to 30%, preferably 15 to 20%.

The oligomer and its preparation are the subject-matter of the patent application Ser. No. P 3,717,669.2.

The polymer which, if appropriate, is likewise present in the coating composition according to the invention should be soluble or swellable in solvents or solvent mixtures having a $\delta_P$ value (delta$_P$ value) greater than 3.5, preferably greater than 5.5 (cal/ccm)$^{\frac{1}{2}}$ and a $\delta_H$ value (delta$_H$ value) less than 6.5, preferably less than 5.0 (cal/ccm)$^{\frac{1}{2}}$.

Suitable polymers are poly(vinyl acetal), poly(vinyl acetate), poly(maleic anhydride), poly-N-vinylpyrrolidone), poly(4-vinylpyridine), poly(methyl methacrylate), poly(ethyl methacrylate), polyacroleine, polyformaldehyde, poly(ethylene oxide), poly(propylene oxide), cellulose acetate, styrene-acrylonitrile copolymers, polyacrylonitrile, polymethacrylonitrile, poly(vinyl chloride), poly(vinylidene fluoride), poly-N-vinylcarbazole, poly-N-vinylacetamide, poly(acrylic anhydride), poly(ethylene carbonate), poly-ε-caprolactam and further polymers or copolymers.

Poly(methyl methacrylate), styrene-acrylonitrile copolymers and poly(vinyl acetal) are preferred.

Besides the oligomer and, if appropriate, the polymer, the coating composition according to the invention can contain further additives, such as, for example, stabilizers, plasticizers, pigments, dulling agents, lubricants and other additives.

The coating composition contains 10 to 100, preferably 30 to 90% by weight, relative to the total amount, of oligomer and 0 to 90, preferably 10 to 70%, by weight, relative to the total amount, of polymer. Further additives are added in addition, if necessary.

The solvents or swelling agents used for the oligomer and the polymer are dipolar aprotic solvents having a $\delta_P$ value greater than 3.5, preferably greater than 5.5 (cal/ccm)$^{\frac{1}{2}}$ and a $\delta_H$ value less than 6.5, preferably less than 5.0 (cal/ccm)$^{\frac{1}{2}}$. The $\delta$ values are listed in A. F. Barton, Handbook of Solubility Parameters and other Cohesion Parameters, CRC Press 1983, pages 153–161.

For example, acetone, acetonitrile, propionitrile, nitromethane, benzaldehyde, benzonitrile, γ-butyrolactone, ε-caprolactone, diethylsulfate, crotonaldehyde, methyl cyanoacetate, furfural, triethyl phosphate, N,N-dimethylformamide, dimethyl sulfoxide, 3-methoxypropionitrile, N-methylpyrrolidone, nitrobenzene, nitromethane, nitroethane, propylene carbonate, sulfur dioxide ($-10°$ C.) and sulfolane are suitable.

Acetonitrile, acrylonitrile, benzonitrile, γ-butyrolactone, diethyl sulfate, furfural, N-methylpyrrolidone, nitropropane, propionitrile, propylene carbonate and triethyl phosphate are preferably used. The $\delta$ values of some preferred solvents are given below:

|  | $\delta_P$ | $\delta_H$ |
| --- | --- | --- |
| Furfural | 7.45 | 2.55 |
| Propylene carbonate | 9.0 | 2.05 |
| γ-butyrolactone | 8.3 | 3.7 |
| Diethyl sulfate | 7.35 | 3.6 |
| Triethyl phosphate | 5.75 | 4.6 |
| Acetonitrile | 9.0 | 3.05 |
| Acrylonitrile | 8.7 | 3.4 |
| Propionitrile | 7.15 | 2.75 |
| Nitromethane | 9.4 | 2.55 |
| Nitropropane | 6.05 | 2.05 |
| N-methylpyrrolidone | 6.15 | 3.6 |

In order to produce the coating composition according to the invention, the oligomer and, if appropriate, the polymer are dissolved or swollen together in the solvent. This takes place at a temperature between the melting and boiling point of the solvent or solvent mixture employed, preferably in the range 0° C. to 80° C., in particular 20° to 60° C., if appropriate with stirring or other mixing techniques. The overall concentration of the two partners in the solvent is 0.1 to 20, preferably 0.5 to 10% by weight. If required, the other additives are then added.

By varying the mixing ratios of oligomer to polymer, the properties of the coating composition such as surface resistance of the coating, specific resistance and film formation, and the mechanical properties of the coating, such as transparency, abrasion resistance and resistance to organic and inorganic liquids, can be matched to the requirements.

The coating composition can be recovered as such from the solution or suspension by known methods but the solution or suspension is preferably further used directly.

The solutions can be processed by customary methods, as are employed in the coating of polymer solutions onto any desired substrates, such as glass, metals, semiconductors and plastics; spin-coating, coating from a flat film die, knife coating, dip coating, spray coating, electrostatic spray coating, roll coating, printing and similar processes. The coating thickness of the coating is determined by the application method, the drying conditions and the viscosity of the solutions, and is usually in the range of 20 nm to 1000 nm.

The coating thickness of the conductive coating furthermore depends substantially on the conductivity desired and the transparency. As the coating thickness increases, surface resistance becomes less and the transparency worse. The conductive oligomers used have a specific resistance between $10^{-3}$ S/cm and 10 S/cm, so that a coating thickness of 100 nm produces a surface resistance between $1\times10^8$ ohms and $1\times10^4$ ohms. The extinction at a coating thickness of 100 nm has a maximum in the visible region between 550 nm and 1000 nm, preferably between 600 nm and 900 nm, at an optical density of 0.1 to 2.0, and the coatings usually appear blue in transmission. This means that the coatings according to the invention are highly transparent in the visible region and simultaneously fulfill very successfully the task of dissipating electrical charges. Applied coatings of this type of electroconductive oligomers of plastics, such as poly(ethylene terephthalate), polyethylene, polypropylene, poly(vinyl chloride), polyacrylonitrile and others are particularly suitable if they are, in addition, transparent in the visible spectral region.

Film sheets can be provided in a simple manner with a conductive coating by using the same processes and machines as are used, for example, in the coating of photographic films, sheets or aluminum bases for offset printing plates. In general, the conductive coating may only be applied to one side of the film as long as the substrate is not excessively thick. If it should be necessary, the other side of the film can also be provided with a conductive coating. This need not necessarily be identical to the conductive coating on the front side.

In addition, it is possible to coat materials having large internal surface areas, such as textiles, fabric webs, fibres, sponges, foamed plastic, etc. by dipping.

By applying thin coats of the coating composition according to the invention having coating thicknesses less than 1 µm, catalysts, electroconductive wires, sensors, semiconductor components, solar cells, protective coatings for solar cells, screening materials, camouflage paints in the infra-red and microwave region, heating conductors for panel heating, special-purpose electrodes, electroconductive films and fibres, film and fibres with an antistatic finish, foams with an antistatic finish, films for audio record sleeves, conductive backing films for film materials, in particular for photographic films and for X-ray films, scale covers for measuring equipment, contrast increase for TV screens combined with prevention of electrostatic charge either by direct coating of the front of the screen or by placing a coated glass or plastic sheet in front of the screen, or by applying a coated film, and touch panel arrangements for display screens can be produced and achieved in a simple manner.

The combination of the particular properties of the soluble, electroconductive oligomers with non-conductive polymers makes possible their use in applications which were hitherto not possible since the customary conductive polymers were not soluble in the doped state. Thus, processes which are employed in the production of microelectronic components can be used in an analogous manner: spin-coating and structuring using known processes of thin-film technology, for example using photo-sensitive coatings or resists.

The examples below are intended to further illustrate the invention. The amounts specified relate to the weight.

EXAMPLE 1

6.59 parts of tetraethylammonium tetrafluoroborate, 4.56 parts of 3-methoxythiophene and 300 parts of acetonitrile were introduced into an undivided electrolysis cell equipped with cooling jacket. The cathode comprised of V2A steel sheeting of length 80 mm and width 55 mm. The anode employed was a carbon felt (weight per unit area about 0.3 kg/m$^2$, specific BET surface area about 1.5 m$^2$/g) of length 80 mm, width 55 mm and thickness 3 mm (geometrical surface area on both sides about 90 cm$^2$). The anode was clamped at a distance of 2 cm parallel to the cathode separated by a polypropylene net spacer. In addition, an Ag/AgCl reference electrode (anode potential against Ag/AgCl 1.48 V) was used. At an electrolysis temperature of 20° C. and an anode current of 400 mA, a cell voltage of 5 to 11 volts was obtained. After half the amount of current theoretically required, the anode, charged with the oligomers, was replaced with a new one and the electrolysis was terminated after consumption of the theoretical amount of current. Each of the anodes charged with the crude product were dried immediately after replacement and placed in a bath containing methylene chloride and repeatedly digested therein for a relatively long period. After re-drying, the oligomer-charged carbon felts were digested in a bath containing acetonitrile until the oligomers had dissolved virtually completely. The intense dark-blue solution was evaporated to dryness on a rotary evaporator. The crude product was comminuted mechanically, washed with water, dried, digested for twelve hours using methylene chloride, subsequently filtered off and dried. For further purification, the material obtained was re-dissolved in acetonitrile and centrifuged for 0.5 hours at 10,000 rpm, and the centrifugate was evaporated to dryness on a rotary evaporator.

2.2 parts of a solid with a bronze metallic luster were obtained. The elemental analysis gave the following values:

45.1% of C, 3.2% of H, 23.1% of S and 9.6% of F. A compressed powder disk of the ground product had a specific conductivity of $7.1 \times 10^{-3}$ S/cm. In DTG, a weight loss of less than 10% was observed up to 260° C. The DSC exhibited a maximum at 305° C. In the mass spectrum of the undoped form, the molecular ions of the pentamer (m/e=562) and the hexamer (m/e=674) were detected. The GPC of the undoped form showed that more than 80% of the product comprised pentamers and hexamers. In the UV/VIS/NIR spectrum in tetrahydrofuran, the undoped pentamer exhibited a maximum at $\lambda=460$ nm and the undoped hexamer a maximum at $\lambda$ 486 nm.

The following components were dissolved by stirring in 100 ml of acetonitrile. 0.8 g of the above-described oligomer and 0.2 g of polymethyl methacrylate, having a melt flow index MFI (230/3,8)=11.0 g/10 min, determined in accordance with DIN 53735, and a molecular weight of $1.2 \times 10^{-5}$ g/mol. The solution was coated onto a 50 mm $\times$ 50 mm glass substrate with the aid of a spin coater at a speed of about 1000 rpm. The thickness of the film was measured using a profilometer and was 53.6 nm. The coating was provided at 2 opposite edges with conductive silver and contacted on each side with two copper wires of diameter 50 $\mu$m. The specific resistance was measured at voltages between $-10$ V and 100 V in 10 V steps using an electrometer in V/I mode. The value determined for the specific resistance was $2 \times 10^3$ ohm. cm. For the same coating a transmission spectrum was recorded which had a maximum at 660 nm and an optical density of 0.37.

The same coating solution was spun, under the same conditions onto a larger glass plate measuring 20 cm $\times$ 20 cm. Extremely homogeneous films of uniform coating thickness were obtained on the glass. These coated glass plates are highly suitable for increasing the contrast of video screens if they are mounted in front of the screen. In addition, it was possible to use, due to their conductivity, for dissipating electrostatic charges induced by the screen. For this purpose, the conductive coating was contacted at the edge with a thin copper wire, as described above and the latter was connected to the protective ground of the instrument. Soiling of the screen was thereby prevented and at the same time the contrast was increased.

EXAMPLE 2

Using the same materials as in Example 1, the following solution was prepared: 0.5 g of conductive oligomer and 0.5 g of poly(methyl methacrylate) in 100 ml of acetonitrile. After spin-coating and measurement as described in Example 1, the following measured values were obtained: coating thickness 49.7 nm, specific resistance $8 \times 10^3$ ohm.cm, maximum extinction at 660 nm, and optical density of 0.27. This solution was likewise spun onto relatively large glass plates and mounted in front of a display monitor. Here too, an improvement in contrast and a good antistatic action were obtained.

EXAMPLE 3

Using the same materials as in Example 1, the following solution was prepared in 100 ml of acetonitrile and spin-coated onto glass plates: 0.2 g of conductive oligomer and 0.8 g of poly(methyl methacrylate). Measurement in the manner described above gave the following data: Coating thickness 50.5 nm, specific resistance $4 \times 10^6$ ohm.cm, maximum extinction at 650 nm and optical density of 0.1. Mounted in front of a video screen, an antistatic action was obtained, but with virtually no improvement in contrast.

EXAMPLE 4

The following components were dissolved by stirring in 28 ml of acetonitrile, 60 ml of 3-methoxypropionitrile and 10 ml of $\gamma$-butyrolactone: 1.0 g of conductive oligomer from Example 1 and 1.0 g of poly(methyl methacrylate) of the same type as in Example 1. A deep blue solution was obtained and was used in a kiss-coat apparatus to coat a polyester film of length 1.5 m and width 0.2 m. The thickness of the film was 125 $\mu$m. In the apparatus, the film was stuck together to form a continuous loop and passed over two rolls arranged vertically. One of the rolls could be driven by a motor. At the lower roll, of diameter 200 mm, the film rested on the liquid surface of the coating solution, the solution wetting the film and forming a meniscus. With the aid of the driven rolls, the film was coated on the surface. A drying device was located on the machine so the film could be dried at the same time. At a band speed of 3.0 m/min, a highly adherent film which had a surface resistance of $2.1 \times 10^8$ ohm and an optical density of 0.32 at a wavelength of 670 nm was thus obtained on the film. The uniformity of the film was excellent and the adhesion of the film thus coated exhibited no defects, even after drawing over a sharp edge.

EXAMPLE 5

4.33 parts of 3-methoxythiophene, 0.26 parts of 3-ethoxythiophene, 4.34 parts of tetraethylammonium tetrafluoroborate and 250 parts of acetonitrile were electrolyzed in an electrolysis cell of the type in Example 1 but without reference electrode, and the product was worked up. 1.2 parts of a solid with a bronze metallic luster were obtained. The elemental analysis gave the following values. 42.5% of C, 2.9% of H, 22.9% of S and 9.0% of F. A compressed powder disk of the ground product had a specific conductivity of $2.0 \times 10^{-3}$ S/cm. In the DTG, a weight loss of less than 10% was observed up to 210° C. The DSC exhibited a maximum at 320° C. In the mass spectrum of the undoped form, the molecular ion of the pentamer (m/e=576) comprising four methoxythiophene units and one ethoxythiophene unit was detected.

1 g of this oligomer was dissolved in 100 ml of a solvent mixture having the following composition: 2 parts of acetonitrile, 4 parts of propionitrile, 2 parts of 3-methoxypropionitrile and 2 parts of nitromethane. 0.8 g of poly(vinyl acetate) (molecular weight about 35,000, softening point 80° to 100° C.) was added to this solution and dissolved by stirring and the mixture was used for coating in the same apparatus as described in Example 4, the band speed being 2.5 m/min. The film used was a 100 μm thick polyester film. A coating which adhered very well to the film and had a surface resistance of $2 \times 10^7$ ohm was obtained.

EXAMPLE 6

The following solution was prepared: 1 g of a conductive oligomer whose preparation is described in Example 1, was dissolved by stirring at room temperature in 40 ml of γ-butyrolactone, 20 ml of acetonitrile, 20 ml of acetone and 10 ml of propionitrile. This solution was used to coat a PVC film of thickness 200 μm using a commercially available spray-coating apparatus. The thickness of the sprayed-on conductive coating depended on the duration of exposure. The surface resistance of the coated film was measured in accordance with DIN 53482 using a protective ring electrode and was $4 \times 10^6$ ohm, and the optical density was 0.8 at 690 nm.

EXAMPLE 7

5.13 parts of 3-ethoxythiophene, 4.34 parts of tetraethylammonium tetrafluoroborate and 250 parts of acetonitrile were electrolyzed as in Example 1, and the product was worked up. 1,2 parts of a solid having a bronze metallic luster were obtained. The elemental analysis gave the following values: 48.1% of C, 4.2% of H, 19.9% of S and 8.5% of F. A compressed powder disk of the ground product had a specific conductivity of $1.0 \times 10^{-2}$ S/cm. In the DTG, a weight loss of less than 10% was observed at 205° C. The DSC exhibited a maximum at 305° C. In the mass spectrum of the undoped form, the molecular ion of the pentamer (m/e=632) was detected.

1 g of the abovementioned oligomer and 1.5 g of a styrene acrylonitrile copolymer were added to a solvent mixture comprising 30 ml of γ-butyrolactone, 10 ml of nitromethane, 10 ml of N-methylpyrrolidone and 10 ml of butyronitrile and dissolved by stirring at 50° C. This solution was transferred into a screen-printing apparatus and used to print a PVC film. The printed pattern comprised mutually perpendicular lines of width 1 mm at a spacing of 1 mm. The surface resistance, measured using a protective-ring electrode in accordance with DIN 53482, was $3 \times 10^7$ ohm.

EXAMPLE 8

The same solution as in Example 7 was used to coat polyacrylonitrile fibres of thickness 100 μm by dipping into the solution. At an exposure time of 1 minute, a coating which adhered very well to the fiber surface was obtained. The resistance of the fibers thus coated was measured by contacting with conductive silver at a spacing of 10 mm and was $1 \times 10^8$ ohm.

We claim:
1. An electroconductive coating composition comprising:
a) 10 to 90% by weight of an electroconductive, positively charged oligomer having three to ten structural units which are connected to one another by linkage in the two-position or five-position or both the two-position and 5-position, on average comprising 60 to 100% by weight of structural units derived from at least one monomer of the formula (I)

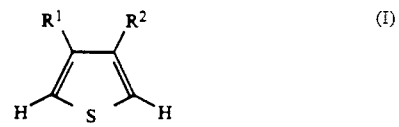

in which
R¹ denotes a C₁-C₁₂ alkoxy group or —O(CH₂CH₂O)$_n$CH₃ where n=1 to 4 and
R² denotes a hydrogen atom, a C₁-C₁₂ alkyl group, a C₁-C₁₂-alkoxy group or —O(CH₂CH₂O)$_n$CH₃ where n=1 to 4, or R¹ together with R² represent —O(CH₂)$_m$—CH₂— or —O(CH₂)$_m$—O—, in which m is 1 to 12,
0 to 40% by weight of structural units derived from at least one monomer of the formula (II)

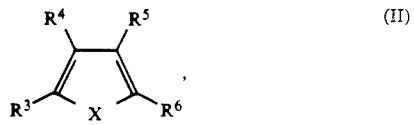

in which R⁴ and R⁵, independently of one another, denote a hydrogen atom, a halogen atom, a C₁-C₁₂-alkyl group or aryl or, together with the carbon atoms linking them, form an aromatic ring,
R³ and R⁶, independently of one another, denote a hydrogen atom, or R³ together with R⁴ and the carbon atoms linking them, or R⁵ together with R⁶ together with the carbon atoms linking them, in each case form an aromatic ring,
X denotes an oxygen atom, a sulfur atom, an =NH group, an =N-alkyl group or an =N-aryl group,
0 to 40 mol % by weight of structural units derived from at least one monomer of formula (III)

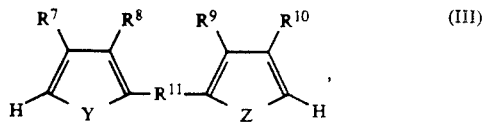

in which R[7], R[8], R[9] and R[10] independently of one another denote a hydrogen atom, a $C_1$-$C_{12}$ alkyl group, a $C_1$-$C_{12}$-alkoxy group or an aryl group, Y and Z, independently of one another, denote an oxygen atom, a sulfur atom, an =NH group, an =N-alkyl group or an =N-aryl group, R[11] denotes an arylene group, a heteroarylene group or a conjugated system of the formula —(—CH=CH)—$_o$, in which o is zero, 1, 2 or 3, 0 to 40 mol % by weight of structural units derived from at least one monomer of the formula (IV)

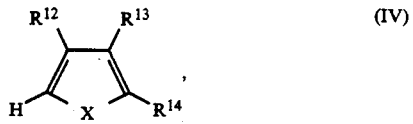

in which

R[12] and R[13], independently of one another, denote a hydrogen atom, a halogen atom, a $C_1$-$C_{12}$-alkyl group, a $C_1$-$C_{12}$-alkoxy group, a $C_1$-$C_4$-alkylamino group or a $C_1$-$C_4$-acylamino group, R[14] denotes a halogen atom, a $C_1$-$C_{12}$-alkyl group, a $C_1$-$C_{12}$-alkoxy group, a $C_1$-$C_4$-alkylamino group or a $C_1$-$C_4$-acylamino group and X has the above-mentioned meaning, where the electroconductive, positively charged oligomer is completely soluble in a dipolar aprotic solvent or mixtures at 25° C., and solutions having a content of at least 0.5 g of the oligomer in 100 ml of solvent or solvent mixtures are obtained of dipolar aprotic solvents at 25° C., and b) 10% to 90% by weight of a non-conductive polymer which is soluble or swellable in solvents having a $\delta_P$ value greater than 3.5 (cal/ccm)$^{\frac{1}{2}}$ and a $\delta_H$ value less than 6.5 (cal/ccm)$^{\frac{1}{2}}$.

2. A coating composition as claimed in claim 1, wherein the oligomer and the polymer are soluble or swellable in solvents or solvent mixtures having a $\delta_P$ value greater than 5.5 (cal/ccm)$^{\frac{1}{2}}$ and a $\delta_H$ value less than 5.0 (cal/ccm)$^{\frac{1}{2}}$.

3. A coating composition as claimed in claim 1, wherein the electroconductive, positively charged oligomer has three to ten units which are connected to one another by linkages in the two-position and the five-position.

4. A coating composition as claimed in claim 1, wherein 100% of said structural units are derived from at least one monomer of said formula (I), and wherein, to obtain said coating composition, said oligomer and said polymer are together soluble or swellable in a solvent or solvent mixture having a $\delta_P$ value >5.5 (cal/ccm)$^{\frac{1}{2}}$ and a $\delta_H$ value <5.0 (cal/ccm)$^{\frac{1}{2}}$.

5. A coating composition as claimed in claim 4, wherein the said solvent or solvent mixture comprises at least one of the following compounds: acetone, acetonitrile, propionitrile, acrylonitrile, benzaldehyde benzonitrile, γ-butyrolactone, ε-caprolactone, diethylsulfate, crotonaldehyde, methyl cyanoacetate, furfural, triethyl phosphate, N, N-dimethylformamide, dimethyl sulfoxide, 3-methoxypropionitrile, N-methylpyrrolidone, nitrobenzene, nitromethane, nitroethane, nitropropane, propylene carbonate, liquefied sulfur dioxide, or sulfolane.

6. An electroconductive coating solution comprising:

0.1–20% by weight of a coating composition as claimed in claim 1, dissolved in 80–99.9% by weight of a dipolar aprotic solvent or solvent mixture having a $\delta_P$ value greater than 3.5 (cal/ccm)$^{\frac{1}{2}}$ and a $\delta_H$ value less than 6.5 (cal/ccm)$^{\frac{1}{2}}$.

7. The coating solution as claimed in claim 6, wherein the polymer is poly(vinyl acetal)poly(vinyl acetate), poly(maleic anhydride), poly-N-vinylpyrrolidone, poly-4-vinyl-pyridine, poly(methyl methacrylate), poly(ethyl methacrylate), polyacrolein, polyformaldehyde, poly(ethylene oxide, poly(propylene oxide, cellulose acetate, styreneacrylonitrile copolymers, polyacrylonitrile, polymethacrylonitrile, poly(vinyl chloride) poly(vinylidene fluoride), poly-N-vinylcarbazole, poly-N-vinylacetamide, poly(acrylic anhydride), poly-(ethylene carbonate) or poly-ε-caprolactam.

8. The coating solution as claimed in claim 6, wherein the oligomer and the polymer are dissolved or swollen in solvents or solvent mixtures having a $\delta_P$ value greater than 5.5 (cal/ccm)$^{\frac{1}{2}}$ and a $\delta_H$ value less than 5.0 (cal/cmm)$^{\frac{1}{2}}$.

9. The coating solution as claimed in claim 8, wherein the polymer is poly(vinylacetal)poly(vinyl acetate), poly(maleic anhydride), poly-N-vinylpyrrolidone, poly-4-vinyl-pyridine, poly(methylmethacrylate), poly-(ethyl methacrylate), polyacrolein, polyformaldehyde, poly(ethylene oxide, poly(propylene oxide, cellulose acetate, styreneacrylonitrile copolymers, polyacrylonitrile, polymethacrylonitrile, poly(vinyl chloride), poly(-vinylidene fluoride), poly-N-vinylcarbazole, poly-N-vinylacetamide, poly(acrylic anhydride), poly(ethylene carbonate) or poly-ε-caprolactam.

10. A process for the production of the coating solution as claimed in claim 6, wherein the oligomer and the polymer are dissolved or swollen together in a solvent having a $\delta_P$ value greater than 3.5 (cal/.ccm)$^{\frac{1}{2}}$ and a $\delta_H$ value less than 6.5 (cal/cmm)$^{\frac{1}{2}}$ at a temperature between the melting and boiling point of the solvent or solvent mixture employed.

11. A process for the production of the coating solution as claimed in claim 8, wherein the oligomer and the polymer are dissolved or swollen together in a solvent having a $\delta_P$ value greater than 3.5 (cal/ccm)$^{\frac{1}{2}}$ and a $\delta_H$ value less than 6.5 (cal/cmm)$^{\frac{1}{2}}$ at a temperature between the melting and boiling point of the solvent or solvent mixture employed.

12. A process for the production of the coating solution as claimed in claim 9, wherein the oligomer and the polymer are dissolved or swollen together in a solvent having a $\delta_P$ value greater than 3.5 (cal/cmm)$^{\frac{1}{2}}$ and a $\delta_H$ value less than 6.5 (cal/ccm)$^{\frac{1}{2}}$ at a temperature between the melting and boiling point of the solvent or solvent mixture employed.

13. A coating composition as claimed in claim 1, obtained from a coating solution comprising:

0.1–20% by weight of a coating composition as claimed in claim 1, dissolved in 80–99.9% by weight of a dipolar aprotic solvent or solvent mixture having a $\delta_P$ value greater than 3.5 (cal/ccm)$^{\frac{1}{2}}$ and a $\delta_H$ value less than 6.5 (cal/ccm)$^{\frac{1}{2}}$.

14. An electroconductive coating composition comprising:

a) 10 to 90% by weight of an electroconductive, positively charged oligomer having three to ten structural units which are connected to one another by linkage in the two-position or five-position or both the two-position and 5-position, on statistical average comprising 60 to 100% by weight of structural units derived from at least one monomer of the formula (I)

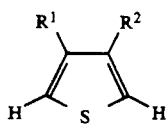

in which $R^1$ denotes a $C_1-C_{12}$ alkoxy group or $-O(CH_2CH_2O)_nCH_3$ where $n=1$ to 4 and $R^2$ denotes a hydrogen atom, a $C_1-C_{12}$ alkyl group, a $C_1-C_{12}$-alkoxy group or $-O(CH_2CH_2O)_nCH_3$ were $n=1$ to 4, or $R^1$ together with $R^2$ represent $-O(CH_2)_m-CH_2-$ or $-O(CH_2)_m-O-$, in which m is 1 to 12, 0 to 40% by weight of structural units derived from at least one monomer of the formula (II)

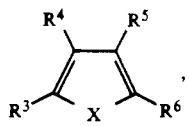

in which $R^4$ and $R^5$, independently of one another, denote a hydrogen atom, a halogen atom, a $C_1-C_{12}$-alkyl group or aryl or, together with the carbon atoms linking them, form an aromatic ring, $R^3$ and $R^6$, independently of one another, denote a hydrogen atom, or $R^3$ together with $R^4$ and the carbon atoms linking them, or $R^5$ together with $R^6$ together with the carbon atoms linking them, in each case form an aromatic ring, X denotes an oxygen atom, a sulfur atom, an $=NH$ group, an $=N$-alkyl group, or an $=N$-aryl group, 0 to 40% by weight of structural units derived from at least one monomer of formula (III)

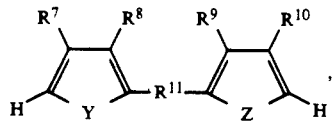

in which $R^7$, $R^8$, $R^9$ and $R^{10}$ independently of one another denote a hydrogen atom, a $C_1-C_{12}$ alkyl group, a $C_1-C_{12}$-alkoxy group or an aryl group, Y and Z, independently of one another, denote an oxygen atom, a sulfur atom, an $=NH$ group, an $=N$-alkyl group or an $=N$-aryl group, $R^{11}$ denotes an arylene group, a heteroarylene group or a conjugated system of the formula $-(-CH=CH)-_o$, in which o is zero, 1, 2 or 3, 0 to 40% by weight of structural units derived from at least one monomer of the formula (IV)

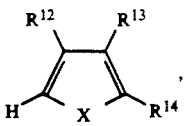

in which $R^{12}$ and $R^{13}$, independently of one another, denote a hydrogen atom, a halogen atom, a $C_1-C_{12}$-alkyl group, a $C_1-C_{12}$-alkoxy group, a $C_1-C_4$-alkylamino group or a $C_1-C_4$-acylamino group, $R^{14}$ denotes a halogen atom, a $C_1-C_{12}$-alkyl group, a $C_1-C_{12}$-alkoxy group, a $C_1-C_4$-alkylamino group or a $C_1-C_4$-acylamino group and X has the abovementioned meaning, where the electroconductive, positively charged oligomer is completely soluble in a dipolar aprotic solvent or mixtures at 25° C., and solutions having a content of at least 0.5 g of the oligomer in 100 ml of solvent or solvent mixtures are obtained of dipolar aprotic solvents at 25° C., and b) 10% to 90% by weight of a polymer which is selected from the group consisting of poly(vinyl acetal), poly(vinyl acetate), poly(maleic anhydride), poly-N-vinylpyrrolidone, poly-4-vinyl-pyridine, poly(methyl methacrylate), poly(ethyl methacrylate), polyacrolein, polyformaldehyde, poly(ethylene oxide), poly(propylene oxide), cellulose acetate, styrene-acrylonitrile copolymers, polyacrylonitrile, polymethacrylonitrile, poly(vinyl chloride), poly(vinylidene fluoride), poly-N-vinylcarbazole, poly-N-vinylacetamide, poly(acrylic anhydride), poly(ethylene carbonate) and poly-ε-caprolactam, which is soluble or swellable in solvents having a $\delta_P$ value greater than 3.5 (cal/ccm)$^{\frac{1}{2}}$ and a $\delta_H$ value less than 6.5 (cal/ccm)$^{\frac{1}{2}}$.

15. A process for the production of the coating composition as claimed in claim 1, wherein the oligomer and the polymer are dissolved or swollen together in a solvent having a $\delta_P$ value greater than 3.5 (cal/ccm)$^{\frac{1}{2}}$ and a $\delta_H$ value less than 6.5 (cal/ccm)$^{\frac{1}{2}}$.

16. A process as claimed in claim 15, wherein the oligomer/polymer mixture is coated onto a substrate and the resulting coating is dried.

17. A plastic film coated with the electroconductive coating composition of claim 1.

18. A plastic film coated with the electroconductive coating composition of claim 5.

* * * * *